May 11, 1937.   F. L. PARKER   2,080,149
AUTOMATIC KNOT TYING MACHINE FOR RIGID BUNDLES
Filed March 21, 1933   11 Sheets-Sheet 3
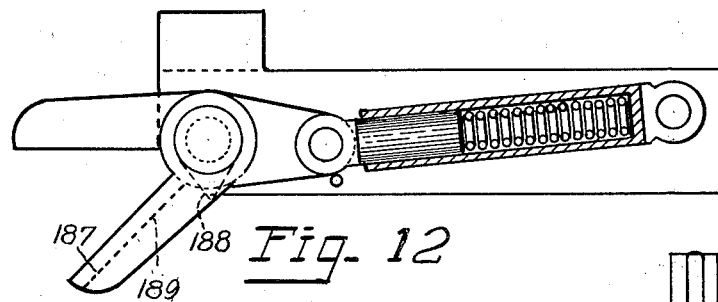
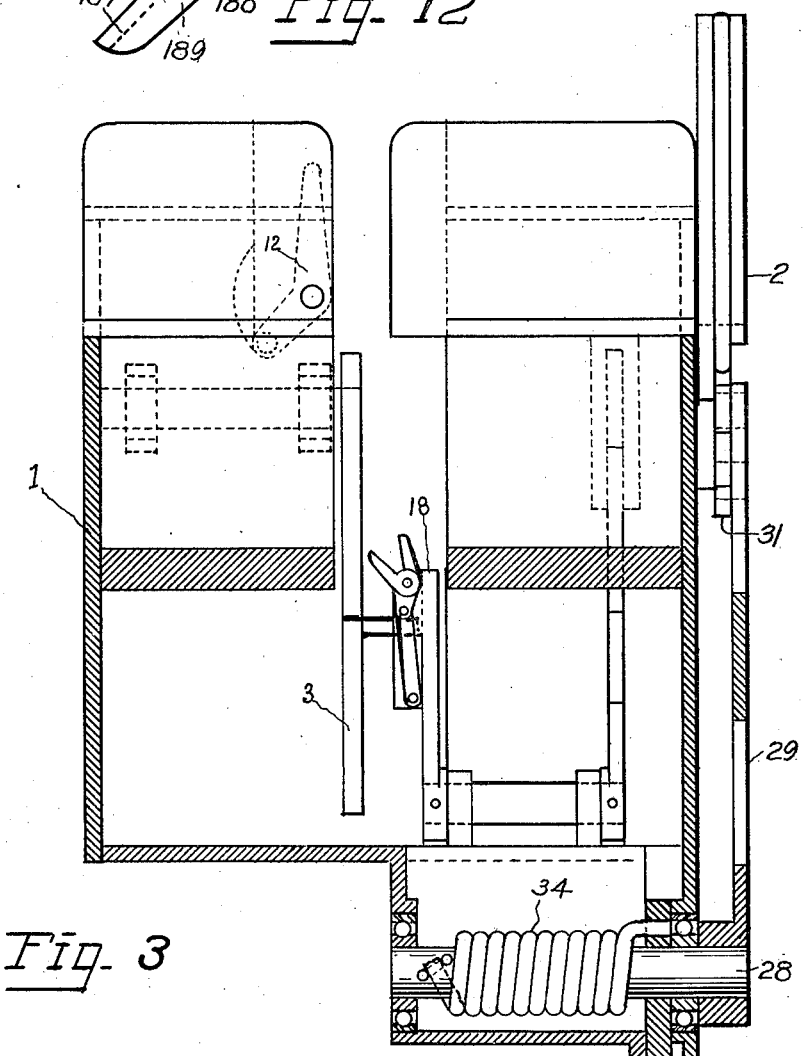
INVENTOR
FRANK L. PARKER

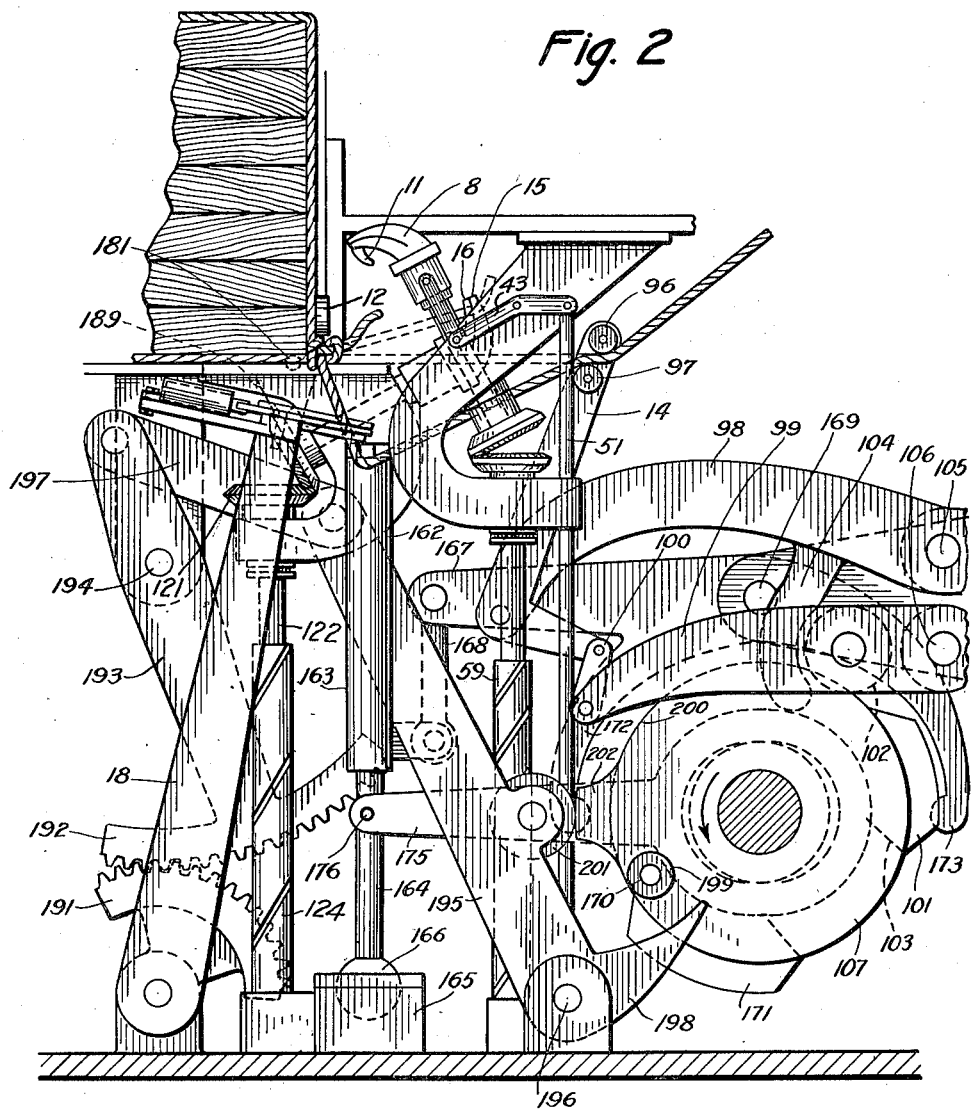

INVENTOR
FRANK L. PARKER

May 11, 1937.  F. L. PARKER  2,080,149
AUTOMATIC KNOT TYING MACHINE FOR RIGID BUNDLES
Filed March 21, 1933   11 Sheets-Sheet 5
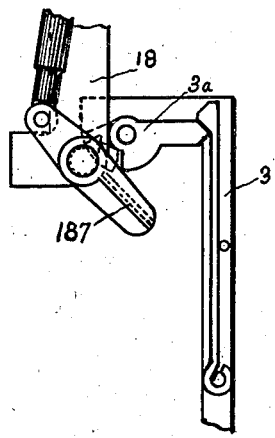
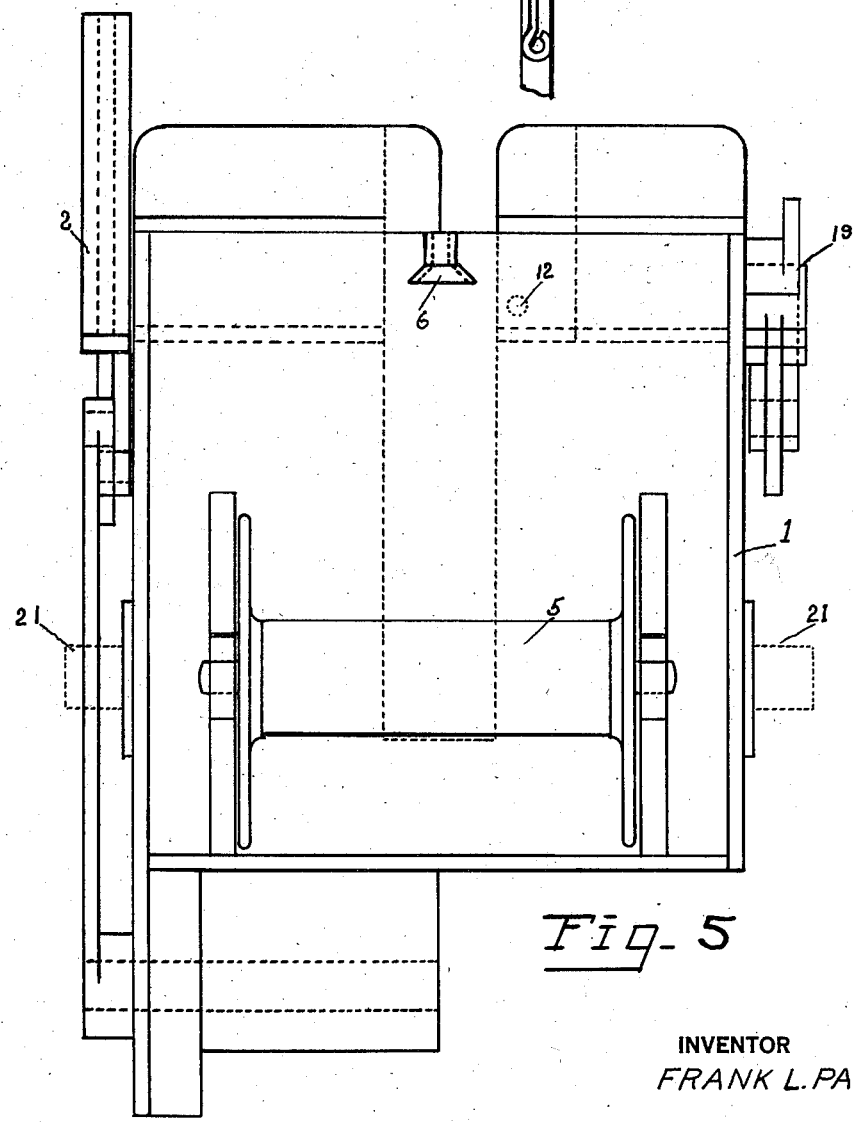
INVENTOR
FRANK L. PARKER

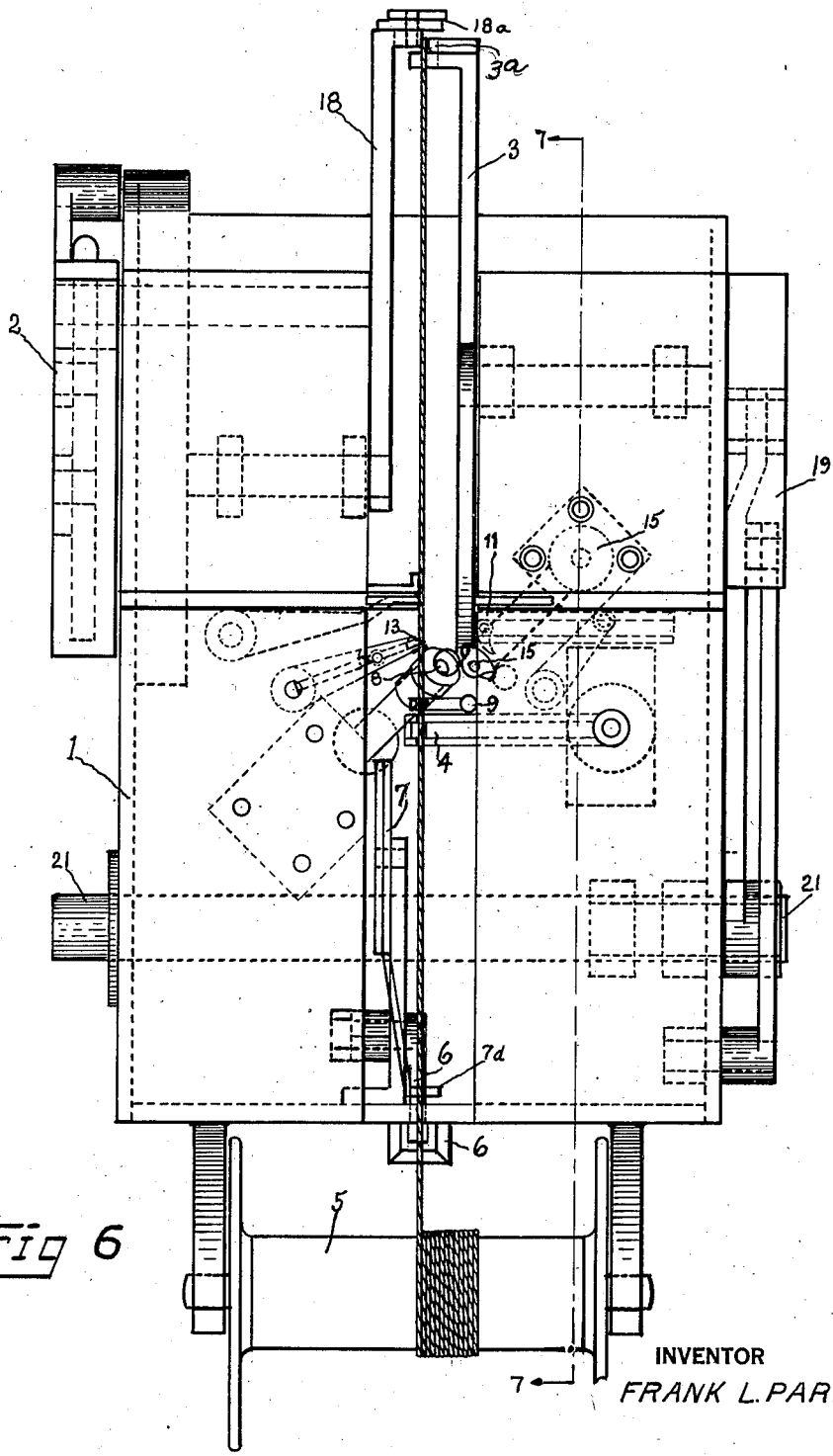

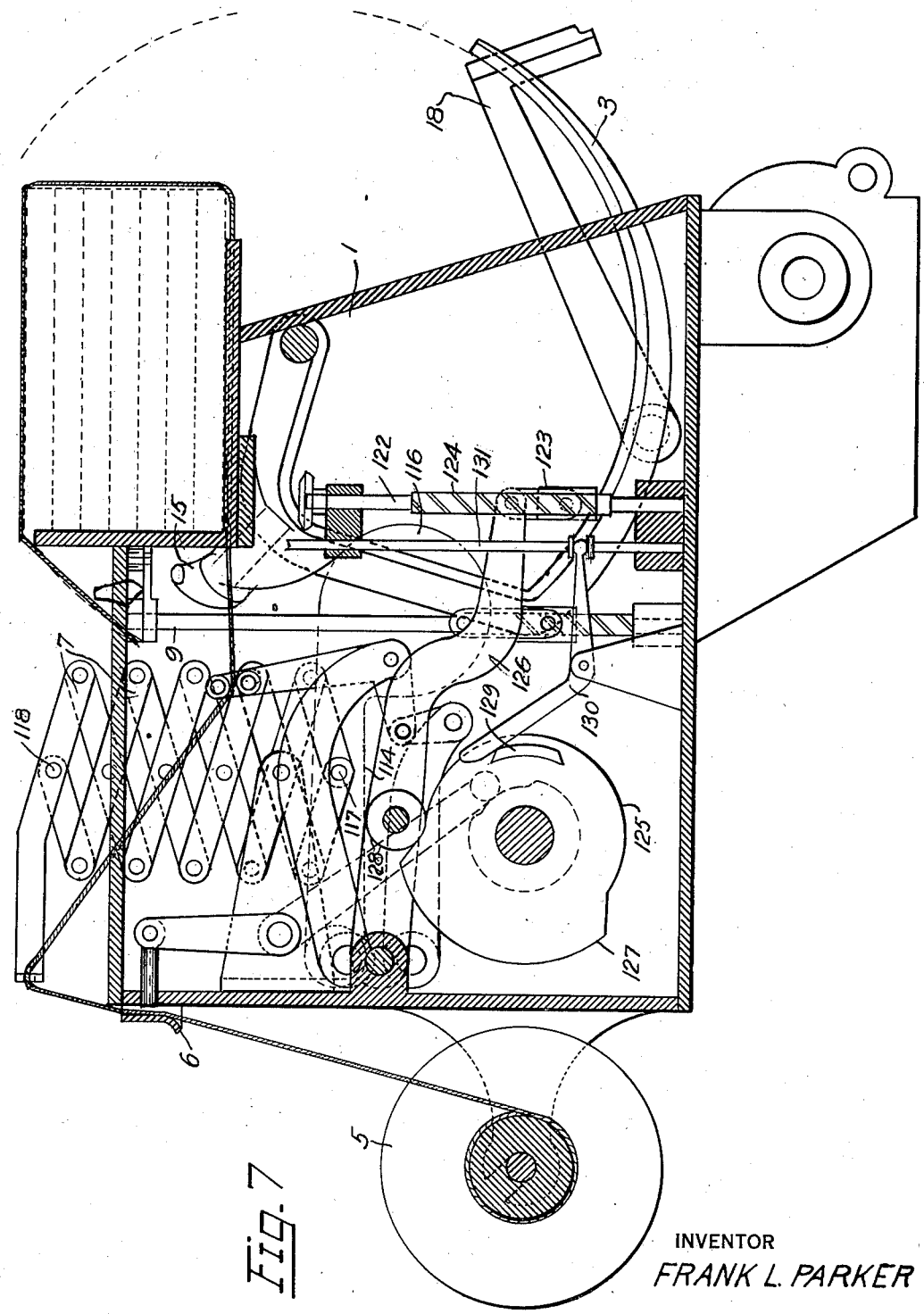

May 11, 1937.　　　　F. L. PARKER　　　　2,080,149
AUTOMATIC KNOT TYING MACHINE FOR RIGID BUNDLES
Filed March 21, 1933　　　11 Sheets-Sheet 8

INVENTOR
FRANK L. PARKER

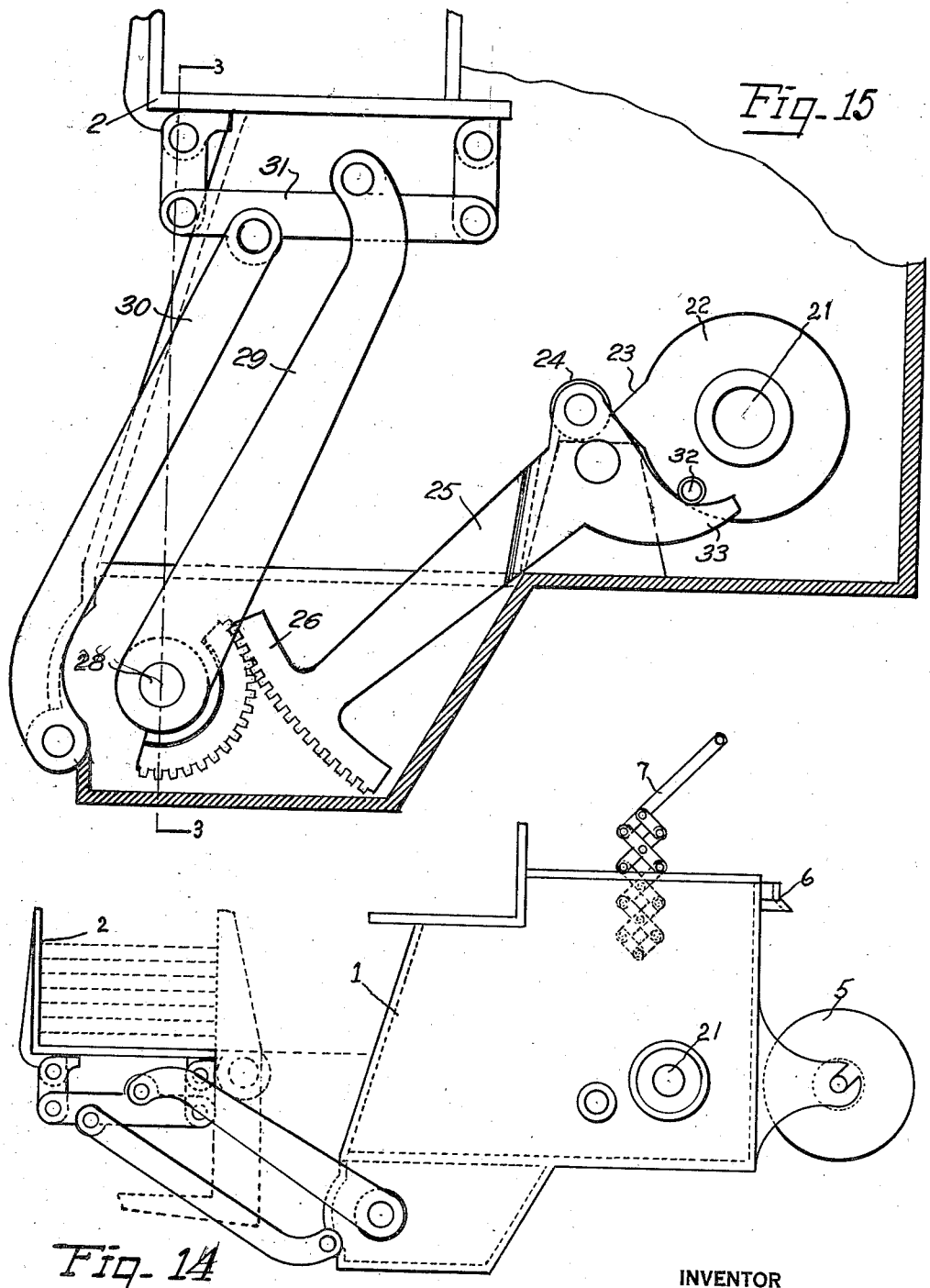

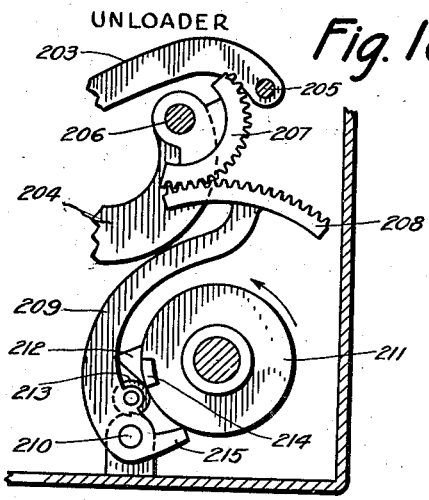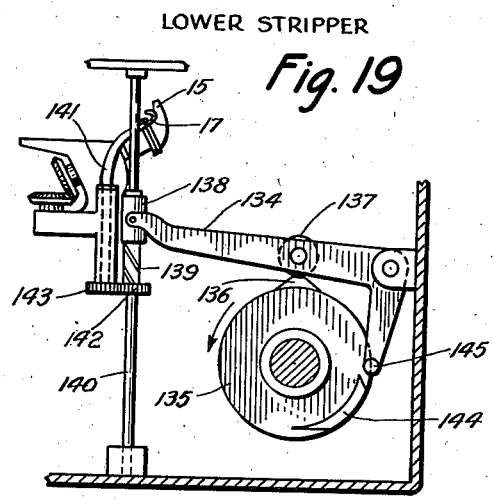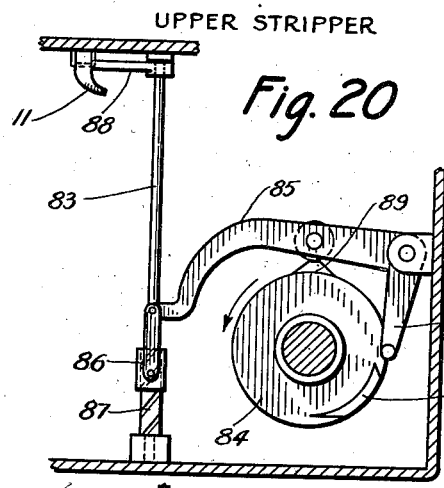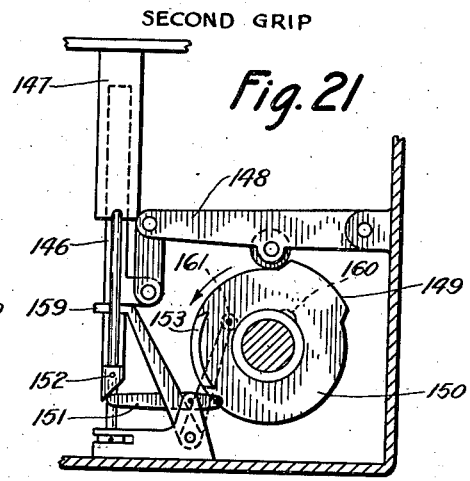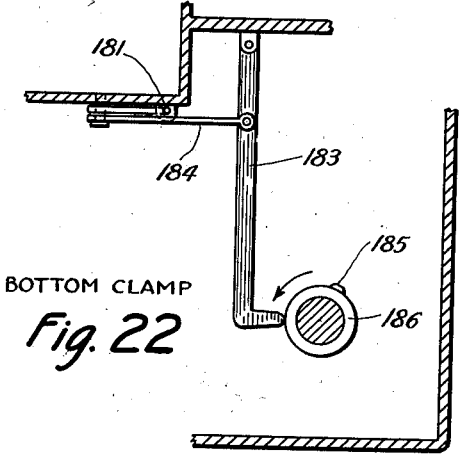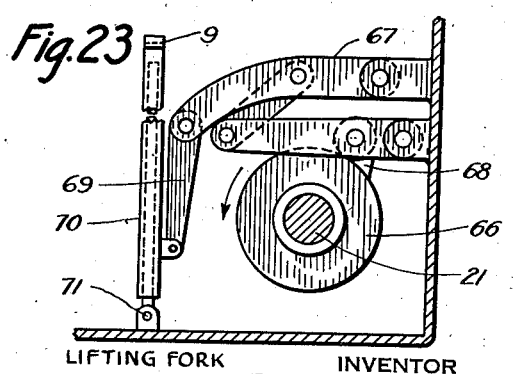

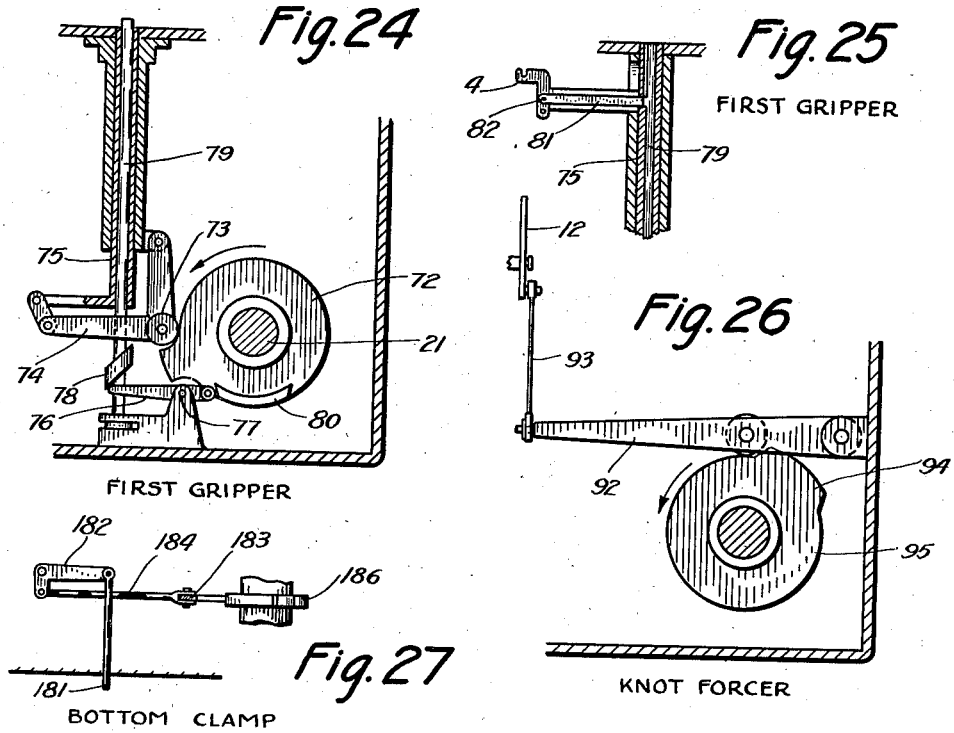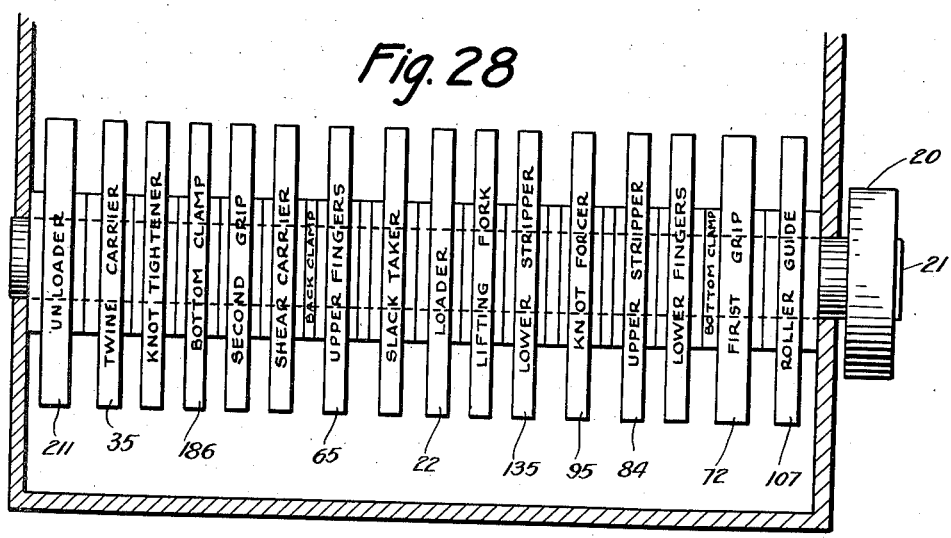

Patented May 11, 1937

2,080,149

UNITED STATES PATENT OFFICE 2,080,149

AUTOMATIC KNOT TYING MACHINE FOR RIGID BUNDLES

Frank L. Parker, Snoqualmie, Wash.

Application March 21, 1933, Serial No. 661,943

6 Claims. (Cl. 100—31)

The purpose of this invention is to provide a machine or device for automatically tying knots around a solid, rigid or non-yielding bundle or object, such as lumber, in which one knot is tied and cinched up against the object, and then a second locking knot is tied to hold the former.

The invention is a knot tying apparatus comprising means for placing objects upon platforms, means passing a cord around said objects, means tying, holding and locking knots in said cord, means cutting said cord, means returning the free end of said cord back to the starting position, and means moving said tied object or objects to another unloading platform, from which they may readily be removed.

Many machines and devices have been provided for tying knots of different descriptions, but substantially all devices tie knots around a yielding object in which the knot tying mechanism may force the said object away from the cord, or so that it will occupy a small space, and then, when the knot is tied, the object may be released so that it will expand and tighten the cord, thereby drawing the knot up tight. This is particularly true of the harvester, in which knots are tied by a very simple movement around a bundle of grain, or the like. This invention utilizes the swinging arm and the revolving gripping fingers of the knot tying mechanism of the harvester and goes a step further in providing means for cinching the knot up against the object, duplicating the operation in tying a second knot, and then utilizes substantially the same movement to cut the twine and return it to the original position.

The object of this invention is, therefore to provide a knot tying machine or apparatus which ties a knot and draws it tight without contracting the object being tied.

Another object is to provide a knot tying machine which ties one knot, draws it up against an object being tied, and then ties a second knot around the loose end of the cord.

Another object is to provide means for automatically tying knots around a non-yielding object, which may be provided in a plurality of units, so that the object may be simultaneously tied at a plurality of points.

A further object is to provide a device for tying knots around a non-yielding object which is automatically adjustable to objects of different sizes.

And a still further object is to provide a machine or device for tying a knot around a non-yielding object, which is of a simple and economical construction.

With these ends in view the invention embodies a platform, an arm adapted to pass a cord around an object on said platform, means receiving the cord from said arm, means tying said cord around a straight piece of cord extending outward from the platform, means cinching the knot up against an object on the platform, means tying a second knot, means cinching the second knot against the first knot, means automatically taking up slack in said cord, and means cutting said cord and returning the free end thereof to the outer end of the arm which carries it around the platform.

Other features and advantages of the invention will appear from the following description, taken in connection with the drawings, wherein:

Figure 2 is a similar view showing a part of the machine with the parts in their respective positions after the second knot has been tied and with the cutting mechanism in the act of cutting the cord.

Figure 3 is a sectional and part elevational view on line 3—3 of Fig. 15 looking toward the loading end of the machine with part broken away, showing the mounting of the loading platform arms.

Figure 5 is an end elevation looking toward the unloading end of the machine and showing a twine spool.

Figure 6 is a plan view showing the twine carrying arm and also the twine cutter and returning lever in the act of feeding the end of the twine to the twine carrying arm.

Figure 7 is a longitudinal section thru the machine on line 7—7 of Fig. 6 also looking toward the side opposite to that shown in Figure 1, showing the second cord operating mechanism and the relative positions of the other parts with the twine carrier arm returned to the starting position.

Figure 11 is a detail showing the ends of the twine carrying arm and twine cutting lever in the position in which the twine cutting lever feeds the end of the twine to the twine carrying arm.

Figure 12 is a view showing a detail of the shears at the end of the twine cutting lever.

Figure 14 is a side elevation of the machine with the parts in the position shown in Figure 1 and with parts omitted.

Figure 15 is an enlarged view showing the loading mechanism with the casing shown in section.

Figure 16 is a detail showing the cam for operating the twine carrier arm.

Figure 17 is a detail showing the cam for operating the operating movement of the knot tightener.

Figure 18 is a detail showing the cams and gears for operating the unloading mechanism.

Figure 19 is a detail showing the arrangement of the lower stripper operating mechanism.

Figure 20 is a view showing a detail of the operating mechanism for the upper stripper, which removes the knot from the first knot tying fingers.

Figure 21 is a view showing the operating mechanism for the second gripper.

Figure 22 is a detail showing the means for operating a clamp that grips and holds the twine below the bundle of lumber as the knot is being tied.

Figure 23 is a detail showing the mechanism for operating the lift fork which raises the lower strand of the twine to the position shown in Figure 1 in order to hold the twine for the first knot.

Figure 24 is a detail showing the mechanism for operating the first gripper which receives the twine from the twine carrying arm.

Figure 25 is a view looking toward the side of the first gripper shown in Figure 24.

Figure 26 is a view showing the operating mechanism for the knot forcer located at the side of the bundle of lumber being tied and adapted to force the knot downward toward the lower corner of the bundle and, at the same time, tighten the knot.

Figure 27 is a plan view showing the clamp shown in Figure 22.

Figure 28 is a view showing a section thru the machine showing the cam shaft and the relative positions of the cams.

Figure 1:
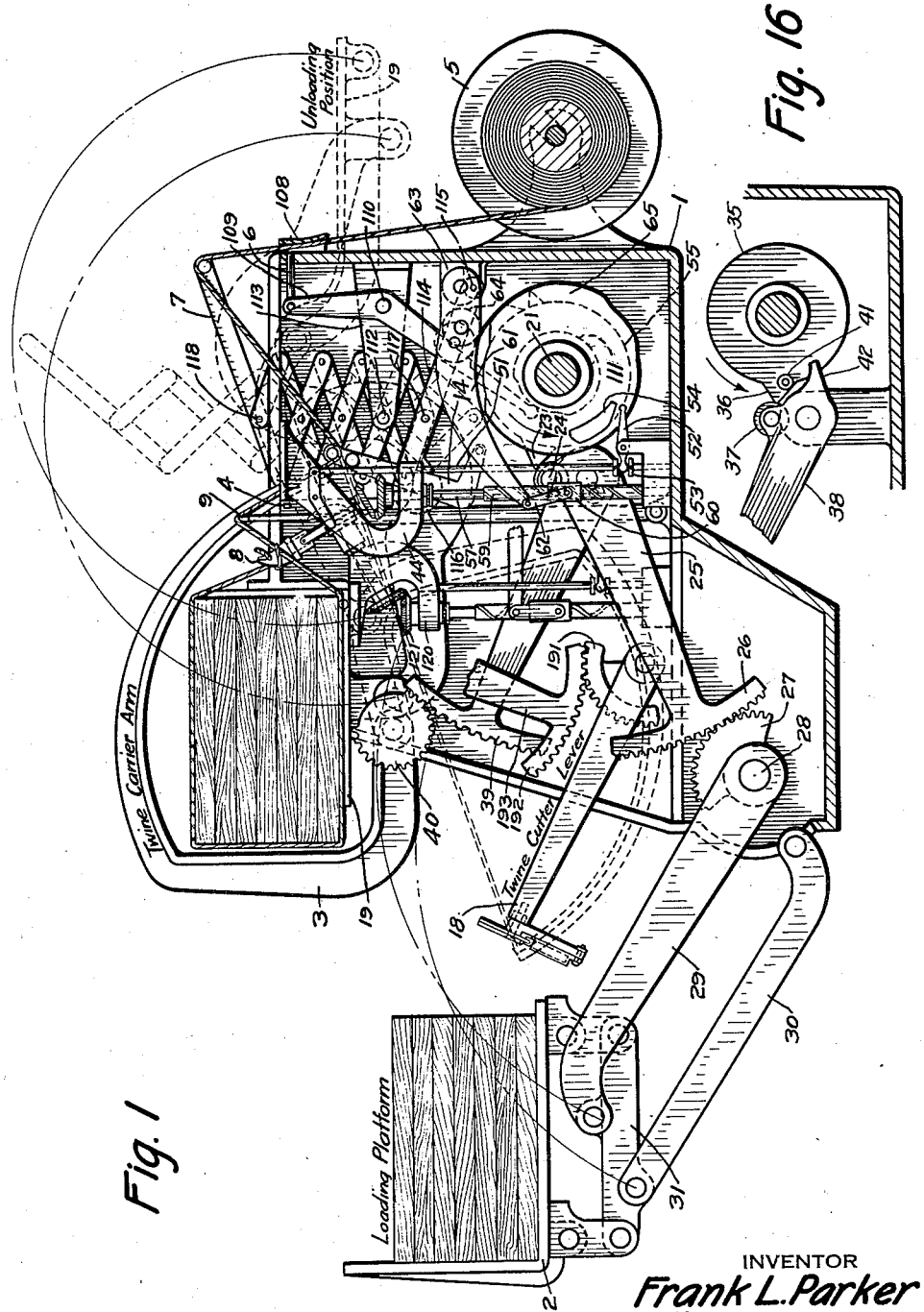
Figure 1 is a longitudinal section thru the machine with parts omitted and with parts broken away, showing one bundle of lumber on a loading platform and another bundle of lumber on the knot tying platform, and showing the parts in their respective positions for tying the first knot.

The relative positions of the respective parts may readily be determined from the following brief description, in which numeral 1 indicates the case or housing which is provided with a loading platform 2 at one end, and the twine carrier arm 3, pivotally mounted in the upper part of the housing and below the tying platform. The first gripping unit which receives the end of the twine, supplied from a spool 5 from the arm 3 into which it is held by the gripper 3a is indicated by the numeral 4 and, as soon as a sufficient amount of the twine has been drawn from the spool, the twine will be gripped by a clamp 6 in the upper corner of the rear of the housing. The slack is then taken out of the twine by the lazy-tongs 7, which are held upward by a counterweight, so that the twine is held in tension during the operation of the first knot tying fingers 8 and the lower strand is elevated to the position shown in Figure 1 by a lifting fork 9. The fingers are formed with a gripping finger 10 to which the twine is fed by the gripper 4, and this grips and holds the end of the twine before it is released from the gripper 4. After the first knot is tied, it is moved off of the end of the fingers 8 by a stripper 11, which is shown in Figure 20, and after the knot is formed and removed from the fingers, it is forced downward against the lower corner of the object being tied by a knot forcer 12, which is pivotally mounted on the tying platform and operated as shown in Figure 26.

Figure 13:
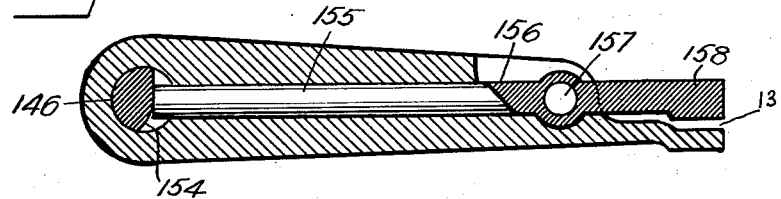
Figure 13 is a sectional detail showing the gripping mechanism which grips and holds the twine as the second knot is being formed, the position of which is shown in Figure 6.

After the first knot is tied, the end of the twine which is still held in the gripping fingers 8 is fed to the second gripping mechanism 13, shown in detail in Figure 13, by the continued movement of the fingers 8 which turn around and move backward to feed the twine through the member 13 and then downward into the gripping fingers 15 between the jaws 7, the cord passes and is held thereby in position for the second knot tying operating mechanism, and with the outer portion of the twine drawn downward by the swinging guide 14.

Figure 9:
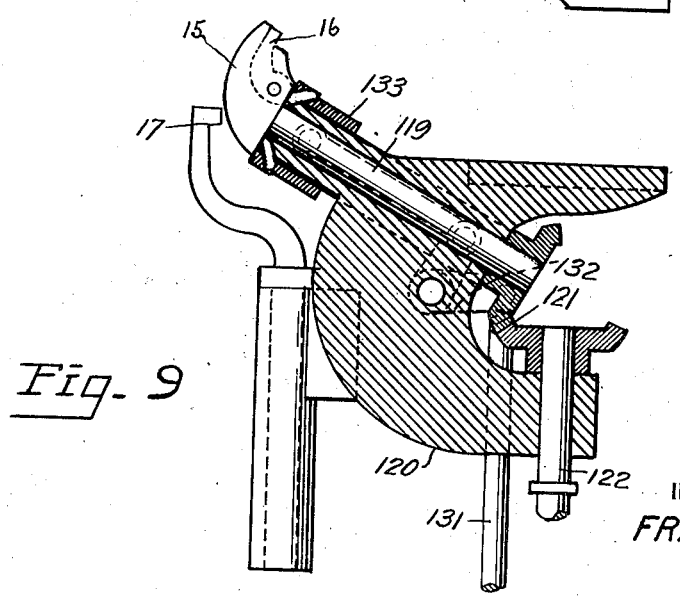
Figure 9 is a similar section showing the second knot tying fingers and also the second stripper for removing the second knot from the fingers.

The second knot is formed by fingers 15 having a jaw 16 therein, which grips and holds the end of the twine and as these fingers rotate, they twist the twine around the free end extending from the first knot and after this knot is formed on these fingers, it is removed therefrom by the second or lower stripper 17, shown in Figures 9 and 19, and after it is removed from the fingers 15, the knot is cinched up against the bundle by the swinging arm 14 operating in conjunction with the lazy tongs 7. The twine is then cut by the shears at the end of the lever 18 which also grips the free end of the twine and carries it back to the gripping mechanism in the end of the arm 3. After the knots are tied, the bundle of lumber is removed by the unloading platform 19, which also forms the knot tying platform when in the position shown in full lines in Figure 1.

It will be understood that this machine may be operated by any suitable motive power, and this may be connected to the cam shaft by any means. In the design shown, the machine is provided with a pulley 20 on one end of the cam shaft 21.

This machine is preferably used in lumber mills and adapted to tie lumber from the planer. From the planer the lumber drops upon a table having a plurality of chains positioned at right angles to the lumber, and these chains move the different lengths of lumber toward the position in which a few of the strips are tied, generally about 6 strips in a bundle. The lumber is sorted on this table and also graded, and the different lengths stacked, ready for tying. These chains feed the bundles of lumber to the loading platforms 2, which may be located in the ends of the table and between the chains. It is preferred to locate these tying machines about every two feet and each machine may be controlled by a separate button, or any number of machines may be controlled by a plurality of buttons, or by an individual button, so that when a bundle of lumber ten feet long arrives upon the loading platforms, buttons may be pressed to operate one of the tying machines located at each end of the bundle, and also another in the center, or as many of the tying machines as may be desired may be operated to tie the lumber at as many points as desired, and the number of machines used, or the number of ties made around the bundle may also be dependent upon the length of the lumber.

When the bundles of lumber arrive upon the loading platforms, the machine is then ready to be operated, and the operating means may be started by buttons, switches, clutches, or by any means, and as this starts, the cam shaft 21 rotates in a counter-clockwise direction, and first operates the loading cam 22 having a projection 23 thereon, which engages a roller 24 on a lever 25 which forces the lever downward to the position shown in Figure 15 and, as this lever moves downward, a gear segment 26 on the end thereof moves a corresponding segment 27 on the shaft 28, and this operates the levers 29 and 30, which are pivotally attached to the platform 2 thru a link 31 and, as these levers move from the position shown in Figure 1 to that shown in Figure 15, they will move the loading platform to the position shown in Figure 15, so that the lumber may be deposited upon the unloading platform 19, and with the lumber deposited upon the platform 19, the platform 2 may be returned to the starting position, and it will be noted that as a roller 32 on the cam 22 engages a projection 33 on the lower side of the lever 25, it will raise the lever to the position shown in Figure 1. This movement will also be assisted by a spring 34 on the shaft 28. The bundle of lumber will, therefore, be deposited in the knot tying position, so that it is ready to be tied.

Figure 8:
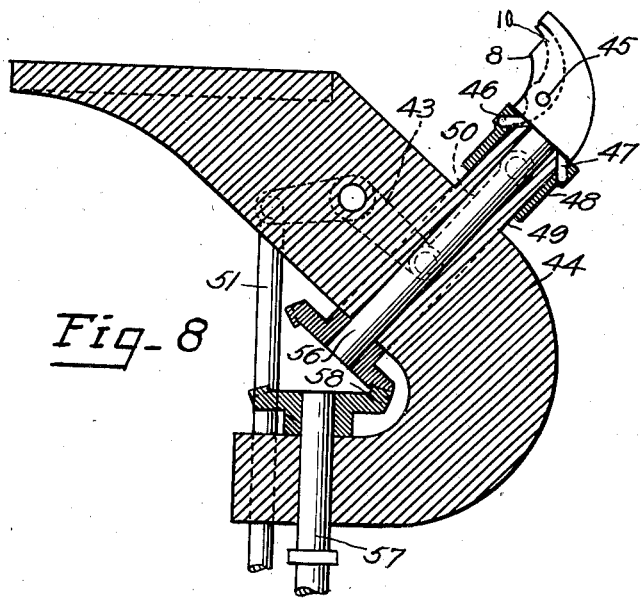
Figure 8 is a sectional detail showing the first knot tying fingers with the mounting means therefor.
Figure 10:
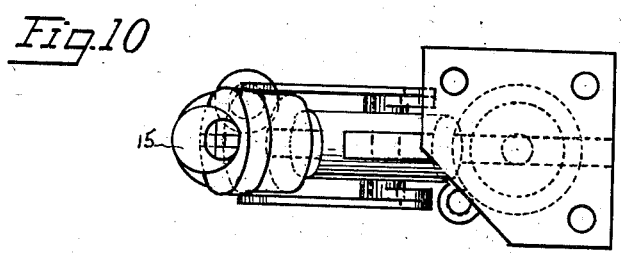
Figure 10 is a plan view of the second knot tying fingers shown in Figure 9.

The next cam 35, as shown in Figure 16, operates the twine carrier arm 3 so that it swings about the bundle of lumber moving from the position shown in dotted lines in Figure 1 to the position shown in full lines. This movement is caused by a projection 36 on the cam 35 engaging a roller 37 on a bar 38 which has a gear segment 39 on the outer end that engages a gear 40 on the hub of the arm 3. During this movement, the end of the member 3 carries the twine around the bundle of lumber and feeds the end thereof into the first gripper 4. As soon as the end of the twine is held in the gripper 4, the roller 41 on the cam 35 engages an arm 42 on the bar 38 and raises the bar which, at the same time, returns the arm 3 to the position shown in dotted lines. With the end of the twine held in the gripper 4, the part of the twine passing over the upper edge of the bundle will pass thru a slot in the fingers 8 and one of the fingers 10 will be operated to grip and hold the end of the twine. The finger 10 is operated by a bell crank 43 pivotally mounted on the side of a bracket 44, in which the fingers 8 are rotatably mounted. It will be noted in Figure 8 that the finger 10 is pivotally mounted on a pin 45 and the lower end 46 thereof extends into a slot 47 in a sleeve 48, and the sleeve 48 is slidable on a projection 49 extending upward from the bracket 44, and this may be operated by a link 50, which is connected to the end of the bell crank 43. The opposite end of the bell crank 43 is connected by a rod 51 to a lever 52 thru a collar 53, and the lever 52 may be operated by a cam surface 54 on a cam 65 on the shaft 21. As the cam surface 54 engages the lever 52, it will raise the rod 51, and this will draw the sleeve 48 downward, thereby opening the finger 10 and, as soon as the surface 54 passes beyond the lever 52 the rod 51 will drop downward and permit the fingers to open. The fingers 8 are mounted upon a shaft 56 extending thru the member 44, and this may be rotated by a shaft 57 thru gears 58. The shaft 57 extends downward and is provided with a threaded sleeve 59 having a collar 60 thereon, and this collar may be moved upward by a lever 61, to which it is connected by links 62, and it will be noted that as the collar 60 moves upward, it will rotate the sleeve 59 and the shaft 57. The inner surface of the sleeve 60 is provided with projections extending into the threads of the member 59. The lever 61 is pivotally mounted on a bracket 63 on the inside of the casing, and is provided with a roller 64, which engages a projection on a cam 65, and as the cam rotates, this projection will raise the lever 61, and thereby rotate the first knot tying fingers 8 thru the shaft 57, the gears 58, and the shaft 56.

Before these fingers are rotated, however, the lifting fork 9 is raised by a cam 66, as shown in Figure 23, thru a plurality of levers 67, and it will be noted that as the projection 68 on the cam 66 raises these levers, they will draw the fork 9 upward thru a link 69 and, as the fork 9 is mounted on the upper end of a member 70, which is pivotally mounted at the point 71, the fork may move slightly to compensate for different movements of the twine. It will be noted that with this fork raised to the position shown in Figure 1, the twine will be held across the fingers 8, so that the first knot may be tied as these fingers make a complete revolution. Before this lifting fork starts upward, however, the twine is gripped and held in the first gripper 4, as shown in Figures 24 and 25, and this is operated by a cam 72, as shown in Figure 24. It will be noted that the projection on this cam engages a roller 73 on a lever 74, and this lever operates the gripper 4 thru the sleeve 75. The gripper is given a turning movement by a lever 76 pivotally mounted on a pin 77 and engaging a bevelled collar 78 on the shaft 79. The lever 76 is operated by a cam surface 80 on the cam 72, and the upper end of the rod 79 is provided with an arm 81 that is pivotally attached to the gripper 4 at the point 82. This gripper operates with a turning movement and grips and holds the end of the twine until it is gripped and held by the fingers 8. After the fingers 8 make a complete revolution, the knot is forced off of the end thereof by an upper stripper 11, which is mounted upon a vertical shaft 83, and this is rotated by the upper stripper cam 84 thru a lever 85 and a collar 86, which slides up a threaded portion 87 at the lower end of the shaft. The stripper 11 is mounted upon an arm 88 at the upper end thereof, and this moves thru an arc as the end thereof forces the knot off of the end of the fingers 8. The lever 85 is moved upward by a projection 89 on the cam 84, as shown in Figure 20, and this is forced downward by the end of an extension 90 engaging a cam surface 91, and this moves the collar 86 downward so that it will rotate the shaft 83 and return the stripper 11 to the normal position. After this movement, the bell crank 12 moves downward from the position shown in dotted lines in Figure 3, and as the long end thereof moves downward, it forces the knot downward against the lower end of the bundle. This lever may be called the knot forcer, and the short end thereof is connected to an arm 92 thru a link 93, as shown in Figure 26, and the arm 92 may be raised to move the forcer downward by a cam surface 94 on a cam 95. As soon as the cam surface 94 passes the engaging point, the weight of the arm 92 will cause the arm to move downward and raise the upper end of the bell crank or knot forcer 12 upward to the position shown in dotted lines in Figure 3.

At the same time, the guide 14 with the rollers 96 and 97 therein, will move outward and downward, and this will also draw the twine downward and away from the knot, so that it will also assist in tightening the knot. The guide 14 is pivotally mounted in the end of an arm 98, and connected to a member 99 thru a link 100, and it will be noted that as a cam surface 101 engages a roller 102 on the member 99, it will raise the member 99, thereby forcing the upper end of the member 14 over and then, as a cam surface 103 engages a projection 104, extending downward from the member 98, it will raise this member and draw the member 14 backward, at the same time raising it. The members 98 and 99 are pivotally mounted on the inside of the housing thru pins 105 and 106, as shown. The cam surfaces 101 and 103 extend outward from a cam 107.

While the cord is being tied, it will be held by a member 6 extending thru an opening at the upper edge of the back of a housing, and this will clamp the cord against a shield 108. The member 6 is mounted on a crank 109, which is pivotally mounted on a pin 110, and the lower end thereof engages a cam 111, as shown in dotted lines in Figure 1. The surface of the cam 111 holds the member 6 in engagement with the cord substantially thruout a complete revolution, and only releases it while the arm 3 is moving from the position shown in dotted lines in Figure 1 to the position shown in full lines.

The lazy tongs 7 for taking the slack out of the twine, are pivotally mounted on a pin 112 at the outer end of the arm 113 and the lower end thereof is connected to a lever 114, which is shown in dotted lines in Figure 7 and also shown in Figure 1, and the inner end of this arm is pivotally attached to the housing at a point 115. On the opposite end of the arm is a counterweight 116, which draws the lower end of the lazy tongs downward, thereby forcing the upper end upward, and the size of the weight 116 may be such that the twine will be held in tension continuously. This arm is pivotally attached to the lower end of the lazy tongs at the point 117, and it will be noted that as this point is pulled downward, the upper end 118 will move upward, thereby drawing the twine upward.

After the first knot is tied, the cord will be in the position shown in dotted lines in Figure 2, in which it will extend straight from the lower end of the bundle to the rollers 96 and 97, thereby extending by the second knot tying fingers 15, and as these fingers with the end of the twine held therein, rotate, a loop will be formed about the end of the twine and, as this is forced off of the ends of the fingers, the end will be drawn thru the loop, thereby forming a knot, as shown in Figure 2.

The fingers 16 are pivotally mounted on a shaft 119 in a bracket 120, and these are operated by gears 121 on the upper end of a shaft 122, and this shaft is rotated by a sleeve 123 sliding upward on a threaded section 124. The sleeve 123 is operated by a cam 125, which raises a lever 126 as a projection 127 thereon engages a roller 128. These fingers are opened and closed by a projection 129 on the cam 125, which engages a lever 130, the opposite end of which lowers a rod 131, and as the rod 131 is lowered, it operates a bell crank 132, which forces a sleeve 133 downward on the bracket 120, thereby opening the jaw 16. This jaw is held open until the end of the twine is fed thereto, and it is then closed while it rotates to form the loop around the end of the twine and then, after the second or lower stripper 17 operates to remove the knot from the fingers 15, and also after the knot has been cinched up against the bundle of lumber, the jaw 16 opens to release the end of the twine. The stripper 17 is operated as shown in Figure 19 thru a lever 134 by a cam 135, and it will be noted that as a projection 136 on the cam engages a roller 137 on the lever, it will raise a sleeve 138 on a threaded sleeve 139 on a vertical shaft 140 and, as this sleeve rotates, it will rotate the vertical stem 141 of the stripper 17 thru gears 142 and 143, and after the knot has been removed from the member 15, a cam surface 144 will engage the lower end 145 of the lever 134 and move the lever downward, thereby returning the stripper 17 to the starting position. While the second knot is being tied, the twine is held by the second gripper 13, which may be operated as shown in Figure 21, in which the gripper is made as shown in Figure 13 and mounted on the upper end of a shaft 146, which is held in a bearing 147. The shaft 146 is raised by a lever 148 thru a projection 149 on a cam 150, and the shaft is given a slight turning movement by a lever 151 engaging a bevelled collar 152 thereon. The lever 151 is operated by a cam surface 153, which forces the short end downward, and as the longer end is forced upward, it will cause a slight turning of the shaft 146, and the bevelled surface 154 thereof will force a pin 155 inward and, as the opposite end of the pin 155 is bevelled, it will raise the short end of a gripper 156, which is pivotally mounted on a pin 157, and thereby close the outer end 158 to grip the cord. This gripper is then moved downward by a fork 159, which is moved outward by a projection 160 on the side of the cam 150, which engages an end 161 of the work 159, and it will be noted that as soon as the cam surface 153 passes off of the end of the lever 151, the cord will be released. The member 14 will then again be operated to draw the twine downward to assist in tightening the knot, and at this time a knot tightener 162, as shown in Figure 2, will move downward, thereby drawing the cord downward from the position shown in dotted lines to the position shown in full lines, so that it may be cut by the shears on the lever 18. The member 162 is mounted on the upper end of a sleeve 163, which is slidable on a post 164 that is pivotally mounted in a bearing 165 thru a ball 166, and this member is raised and lowered by a lever 167, to which it is connected by a link 168. The lever 167 is pivotally mounted on a pin 169 and is raised and lowered by a cam 170 having a projection 171 thereon, which engages the lower ends of two downwardly extending arms 172 and 173. It will be noted that when the projection 171 engages a knob at the end of the arm 172, the outer end of the lever 167 will be raised and when this projection engages the knob on the opposite end 173, the outer end of the lever will be lowered. At the same time, the rod 164 will be moved backward and forward by an eccentric 174, shown in Figure 17, to which it is connected by an arm 175 at the point 176, and the arm 175 is provided with a roller 177, which may be engaged by a projection 178 on a cam 179 and, as this roller is engaged by the projection, the rod 164 will be moved over to the position shown in dotted lines in Figure 17 and, as soon as the roller rides off of the projection, the rod may be returned by the movement of the lever 167; however, a spring 180 is shown connected to the eccentric 174 so that it may assist in drawing the eccentric back to the position shown in full lines Figure 17. This spring may, however, be omitted.

The lower strand of the cord beneath the bundle may also be held by a clamp 181, shown in dotted lines in Figure 2 and shown in detail in Figures 22 and 27. This clamp is formed by a rod connected to a bell crank 182, and the bell crank is connected to a vertical lever 183 by a ring 184, as shown in Figure 22. The lower end of the bell crank may be moved outward by a projection 185 on a cam 186 when it is desired to grip the twine, and it will be noted that the projection 185 may be of any length so that the twine may be gripped and held as long as may be desired.

After the second knot is tied and the twine is held downward by the member 162, the lever 18 is moved from the position shown in Figure 1 to that shown in Figure 2, and as it arrives in this position, the shears 187 are operated by a projection 188 thereon engaging a bead 189 below the bundle of lumber and, as these projections engage, the shears will close and cut the twine. At the same time, the lower end of the twine will be gripped and held by beads on the lower sides of the shears, so that this end will be carried backward with the arm 18 and fed to the clamping means in the outer end of the arm 3, as shown in Figure 11, and when the arm arrives in this position, the projection 188 will engage the end of the arm 3 and open the gripping jaws in the end thereof, so that the end of the twine may be held therein. The shears 187 are held in both the open and closed positions by a spring barrel 190, as shown in Figure 12, as the end of the barrel passes over the center, it will positively hold the shears in either position.

The lever 18 is provided with a gear segment 191 on the hub thereof which meshes with another gear segment 192 on a lever 193, which is pivotally mounted on a pin 194, and this lever is operated by a lever 195, pivotally mounted on a pin 196 and connected to the upper end thereof by a link 197. The lever 195 is provided with a projection 198, which is engaged by a roller 199 on a cam 200, which moves the lever in one direction, and the lever 195 is provided with a roller 201, which is engaged by a projection 202 on the cam 200 to move the lever in the opposite direction. It will be noted that with the lever 18 in the position shown in Figure 2, the projection 202 holds the roller 201 away from the cam, thereby holding the lever 193 in the position shown in full lines, and as soon as the roller 201 rides off of the projection 202, the roller 199 engages the projection 198 and moves the lever 195 in the opposite direction, thereby returning the lever 193 and moving the lever 18 to the position shown in Figure 1. With this movement, the machine is set ready for another bundle of lumber, and the complete tying action may be repeated, as hereinbefore described.

Figure 4:
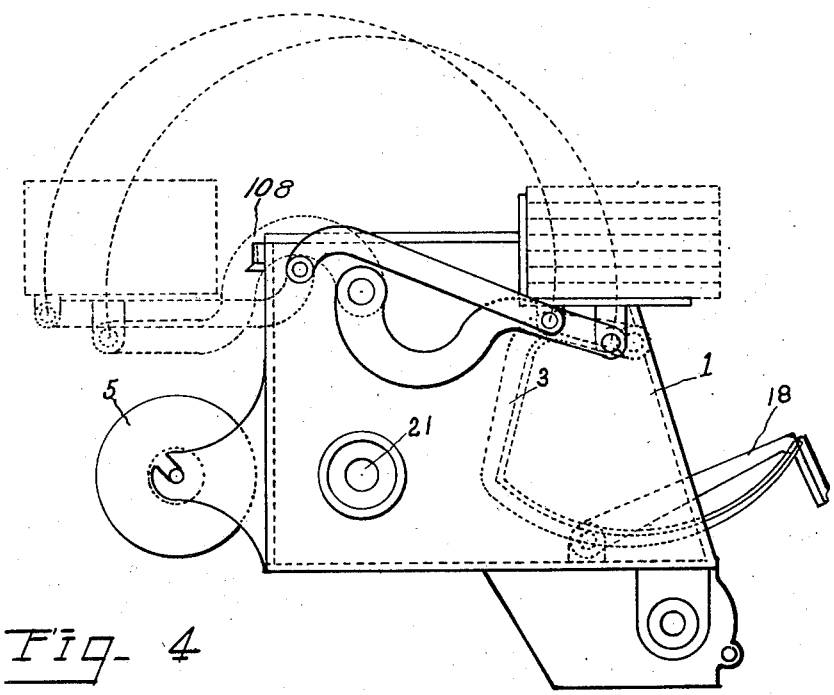
Figure 4 is a side elevation looking toward the side opposite from that shown in Figure 1 and showing the unloading levers.

After the knots are tied and the ends cut, the bundle of lumber is moved from the tying position shown in Figure 1 to the unloading position in which the platform 19 is shown in dotted lines above the spool 5. The unloading levers are shown in dotted lines in Figure 1, and in full lines in Figure 4. This platform is operated by two levers 203 and 204, which are pivotally mounted on shafts 205 and 206, as shown in Figure 18, and the lever 204 is provided with a segment 207, which meshes with another gear segment 208 on a lever 209, which is pivotally mounted on a pin 210. The lever 209 is operated by a cam 211, having a projection 212 thereon that engages a roller 213, and it will be noted that as the cam rotates in the direction of the arrow shown in Figure 18, the projection 212 will engage the roller 213 and force the lever over so that the gears will move the levers 203 and 204 from the position shown in full lines in Figure 4 to that shown in dotted lines in Figures 1 and 4, and with this movement the bundle of lumber will be moved to the unloading position. The lumber will be moved from this position by hand immediately and the levers will be returned, so that the platform will be in the tying position, by a cam surface 214 on the cam 211, which will engage a projection 215 on the end of the lever 209 and thereby move the lever back to the position shown in Figure 18.

It will be appreciated that, altho all of these operations are made with positive movements from the cams on the cam shaft 21, these parts may be moved by any other means, or any combination of the movements may be used to complete the operation of the machine.

Other changes may be made in the construction without departing from the spirit of the invention. One of which changes may be in the use of a housing of any other type or design, another may be in the use of any other means for gripping and holding the twine at the different points, another may be in the use of wire or any other material instead of twine, and still another may be in the use of the device for tying any other objects or for any other purpose.

The construction may readily be understood from the foregoing description. In use these devices may be used as shown and described, and they may be arranged in the table from which lengths of lumber are conveyed from a planer or other device, and as the bundles of lumber are placed on the platform, the respective parts may be successfully operated to place the cord around the bundle, adjust the positions of the cord to the respective knot tying positions, and tie the knots as hereinbefore described. The tied bundles may then be removed and another bundle placed in the tying position with the same operation of the respective parts.

Having thus fully described the invention, what I claim as new and desire to secure by Letters Patent, is:

1. A knot tying machine of the type for tying rigid bundles comprising a stationary cradle, a movable cradle adapted to receive objects to be tied, and place them upon said stationary cradle, other means for removing objects from said stationary cradle, a source of cord supply, an arm adapted to pass the cord around the object on said stationary cradle, means tying a knot in the cord, means cinching said knot up against the object on said stationary cradle, additional knot tying means for tying a second knot with the cord, means cinching said second knot against said first knot with the free end of the cord held in tension, means cutting the cord, and means on said cutting means for returning the free end to the outer end of the arm adapted to carry the cord around the cradle.

2. The combination of a knot tying machine adapted to tie knots around a non-yielding object, of means tying one knot against said object, additional means adapted to tie a second knot around the cord, means cinching the second knot against the first and means holding the free end of the cord in tension, while the second knot is moved against the first.

3. The combination as described in claim 2 in which a plurality of levers pivotally mounted, counterweighted and adapted to be contracted by a cam are provided for automatically taking up slack in the strand from which the knot is tied.

4. The combination as described in claim 2 having means cutting the strand from which the knots are formed and returning said strand to a starting position.

5. A knot tying apparatus comprising an arm adapted to pass around a rigid object to be tied, means at the end of said arm for carrying the end of a cord, gripping fingers to tie the end of the cord around the portion of the cord extending around the object to be tied, a second set of gripping fingers for tying a second knot, means operating said second set of gripping fingers to take the cord from said first set and with the same movement tie the second knot, means cinching the second knot against the first, means holding the free end of the cord in tension as the second knot is tied, and means severing said cord and returning the free end thereof to said arm.

6. A device as described in claim 5 characterized by lazy tongs having a roller over which the cord passes and having a counterweight adapted to raise said lazy tongs to take up slack in the cord.

FRANK L. PARKER.